(12) United States Patent
Moscirella et al.

(10) Patent No.: US 7,590,886 B2
(45) Date of Patent: Sep. 15, 2009

(54) METHOD AND APPARATUS FOR FACILITATING DEVICE REDUNDANCY IN A FAULT-TOLERANT SYSTEM

(75) Inventors: Steven J. Moscirella, Phoenixville, PA (US); David M. Bjordammen, Blue Bell, PA (US); Arthur P. Jost, Mount Laurel, NJ (US); Robert E. Mack, Collegeville, PA (US)

(73) Assignee: General Instruments, Corporation, Horsham, PA (US)

( * ) Notice: Subject to any disclaimer, the term of this patent is extended or adjusted under 35 U.S.C. 154(b) by 561 days.

(21) Appl. No.: 11/561,931

(22) Filed: Nov. 21, 2006

(65) Prior Publication Data

US 2008/0120177 A1   May 22, 2008

(51) Int. Cl.
*G06F 11/00* (2006.01)
(52) U.S. Cl. ............................................. 714/13; 714/4
(58) Field of Classification Search ..................... 714/13
See application file for complete search history.

(56) References Cited

U.S. PATENT DOCUMENTS

| | | | |
|---|---|---|---|
| 5,999,947 A * | 12/1999 | Zollinger et al. ............ 707/203 |
| 6,654,902 B1 * | 11/2003 | Brunelle et al. ................. 714/4 |
| 7,076,555 B1 * | 7/2006 | Orman et al. ................ 709/227 |
| 7,194,652 B2 * | 3/2007 | Zhou et al. ...................... 714/4 |
| 7,366,960 B2 * | 4/2008 | Shrivastava et al. ........... 714/48 |
| 2002/0087912 A1 * | 7/2002 | Kashyap ....................... 714/13 |
| 2002/0120597 A1 * | 8/2002 | Bae .............................. 707/1 |

* cited by examiner

*Primary Examiner*—Gabriel L Chu

(57) ABSTRACT

Method and apparatus for facilitating device redundancy in a fault tolerant system is described. One aspect of the invention relates to common redundancy for a set of devices in a redundancy group. Each of the devices is in either an active role or a standby role. Virtual configurations for the devices are stored in a management system. Advertisements are periodically sent from each of the devices in the active role to each of the devices in the redundancy group. Each of the advertisements includes a configuration sequence number. An update in one of the virtual configurations is announced by incrementing the configuration sequence number in at least one of the advertisements. An updated virtual configuration is obtained at each of the devices in the standby role from the management system in response to detecting the configuration sequence number as incremented in the at least one advertisement.

20 Claims, 5 Drawing Sheets

METHOD AND APPARATUS FOR FACILITATING DEVICE REDUNDANCY IN A FAULT-TOLERANT SYSTEM

BACKGROUND OF THE INVENTION

1. Field of the Invention

The present invention relates to fault-tolerant systems and, more particularly, to a method and apparatus for facilitating device redundancy in a fault-tolerant system.

2. Description of the Background Art

Fault tolerant systems commonly provide redundancy among constituent devices. Redundancy is often provided for devices that are critical to the system. If a device in a fault tolerant system fails, the system will ideally "failover" to another device. For example, redundancy is often provided in internet protocol (IP) networks as such networks become critical resources in many organizations. A single router failure may prevent communication to and from each host and user connected to the router. In many IP networks, it is common to provide redundancy through the use of multiple routers such that a backup router functions in the event of failure of a primary router. This is accomplished through the use of a virtual router protocol, such as the virtual router redundancy protocol (VRRP) and the like. Of course, redundancy is employed in various other types of systems in addition to IP networks. However, present redundancy protocols are dependent on particular devices and systems. For example, VRRP is specific to redundancy for routers in an IP network. Accordingly, there exists a need in the art for a redundancy mechanism in a fault-tolerant system capable of supporting a diverse set of devices having potentially complex configurations.

SUMMARY OF THE INVENTION

Method and apparatus for facilitating device redundancy in a fault tolerant system is described. One aspect of the invention relates to common redundancy for a set of devices in a redundancy group. Each of the devices is in either an active role or a standby role. Virtual configurations for the devices are stored in a management system. Advertisements are periodically sent from each of the devices in the active role to each of the devices in the redundancy group. Each of the advertisements also includes a configuration sequence number. An update in one of the virtual configurations is announced by incrementing the configuration sequence number in at least one of the advertisements. An updated virtual configuration is obtained at each of the devices in the standby role from the management system in response to detecting the configuration sequence number as incremented in the at least one advertisement.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Method and apparatus for implementing redundancy among devices in a data processing system is described. In one embodiment, an M:N device redundancy approach is provided that supports a group of redundant devices having M standby devices and N active devices ("redundancy group"). A generic signaling protocol and failover mechanism are provided that is suitable for a diverse set of devices. For example, the M:N redundancy approach may be employed in a cable television headend having various types of devices, such as encoders, encryptors, multiplexers, and the like that process and distribute video signals. While a cable headend is described herein as an example, those skilled in the art will appreciate that the redundancy approach of the invention may be employed in other types of systems where device redundancy is desired.

Figure 1:
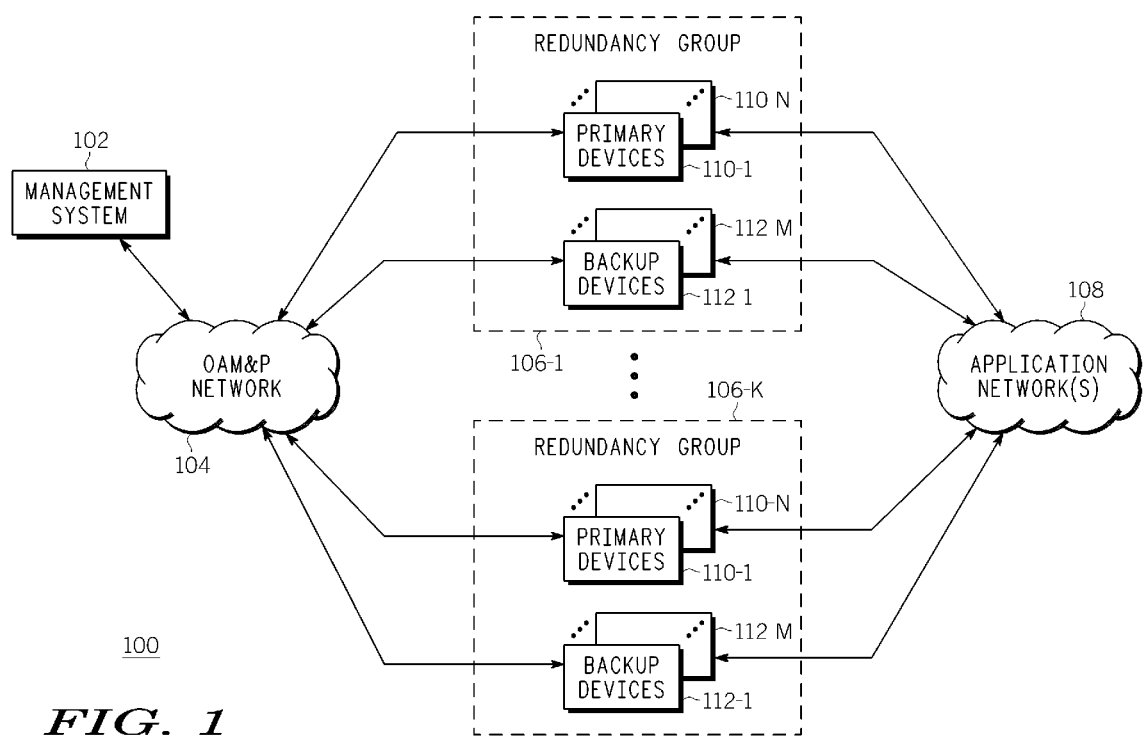
FIG. 1 is a block diagram depicting an exemplary embodiment of a fault-tolerant system in accordance with one or more aspects of the invention.

FIG. 1 is a block diagram depicting an exemplary embodiment of a fault-tolerant system 100 in accordance with one or more aspects of the invention. The system 100 includes a management system 102, an operations, administration, maintenance, and provisioning (OAM&P) network 104, redundancy groups 106-1 through 106-K (where K is an integer greater than zero), and one or more application networks 108. The redundancy groups 106-1 through 106-K are collectively referred to as redundancy groups 106. Each of the redundancy groups 106 includes primary devices 110-1 through 110-N (collectively primary devices 110) and backup devices 112-1 through 112-M (collectively backup devices 112), where M and N are integers greater than zero. The primary devices 110 in each of the redundancy groups 106 are coupled to the OAM&P network 104 and one or more of the application network(s) 108. Likewise, the backup devices 112 in each of the redundancy groups 106 are coupled to the OAM&P network 104 and one or more of the application network(s) 108.

Each redundancy group 106 implements M:N redundancy. The primary and backup devices 110 and 112 work together to detect, report, and switchover when any device fails. When an operator defines a redundancy group, the operator identifies the preferred role of a device. The primary devices 110 are initially assigned the role of active, and the backup devices 112 are initially assigned the role of standby. Active devices are fully operational devices providing service to the system 100. Standby devices do not actively provide service to the system 100. Standby devices monitor the health and status of the active devices and are configured to transition to an active state in the event any of the active devices fail. At any given time, a device may be operating in a mode that is different from its preferred role. For example, when a primary device 110 fails, a backup device (if one is available and operating in standby mode) transitions into an active mode assuming the role of the failed primary device.

Each of the devices 110 and 112 has a configuration referred to as a native configuration. A portion of the native configuration remains with each device as it transitions between active and standby roles ("fixed portion"). In one embodiment, the fixed portion of the native configuration includes an internet protocol (IP) address(es) of the interface (s) used to manage the device and the redundancy group ("native IP address"). The fixed portion of the native configuration also includes redundancy parameters. The redundancy parameters are used to configure how a device operates within a redundancy group, as well as to provide feedback status on its current operations regarding redundancy.

The remaining portion of the native configuration changes as a device transitions roles and assumes the configuration of another device. This portion of the native configuration is referred to as the device's virtual configuration. The virtual configuration includes a virtual IP address, a virtual device identifier (VDID), and device operating parameters. In a redundancy group 106, each of the active devices is assigned a VDID. A device can take the logical identity of another device within the redundancy pool using the parameter values as specified by the virtual configuration. The virtual configuration for each of the primary devices 110 represents the pool of configurations that will be used by the redundancy group. For all IP interfaces, the virtual configuration defines a virtual IP address so devices external to the redundancy group can use the virtual IP address to communicate with a device assuming that virtual configuration. When a device assumes one of these virtual configurations and uses its virtual IP address, the device virtually appears as the primary and is referred to as a virtual device. The virtual configurations for each redundancy group 106 are stored by the management system 102. For example, the management system stores all the virtual configurations and loads the native configurations into the primary and standby devices.

In operation, each device in an active role periodically sends advertisements at a configurable interval. In one embodiment, each advertisement comprises a heartbeat message that is sent as an simple network management protocol (SNMP) trap and transmitted using an IP multicast address so all devices in the redundancy pool can receive the same message. Each active device may transmit the heartbeat on multiple interfaces (e.g., the network 104 and the network 108) to prevent unnecessary failovers due to network issues. Each heartbeat message includes a VDID, a priority, and a configuration sequence number. Heartbeat messages may also include other parameters, such as alarm status and available status parameters. These heartbeat parameters are discussed below. The presence of a periodic heartbeat message for a particular virtual device indicates that the device is operating normally.

If an active device detects a fatal failure, the device can set its priority to zero in order to request that another device takeover. The alarm status and availability status parameters would respectively indicate the device's overall alarm severity and a failed availability status. The heartbeat is also used to identify contention among two or more active devices that have assumed the same virtual configuration. When an active device receives a heartbeat from another device operating with the same VDID, the device with the lower priority resigns and reverts to a standby role. The heartbeat message also conveys the status of a device's configuration. Anytime a new configuration is saved on the device, the configuration sequence number is incremented. Subsequent heartbeat messages would reflect the updated configuration sequence number to signal to standby devices that they need to update the configuration files for the associated virtual device. Anytime a standby device takes over for a failed device, the standby device uses the latest configuration sequence number used by the failed device to prevent unnecessary reloading of configuration files by other standby devices.

A standby device monitors the periodic heartbeat message to assess the health and status of the active devices. For a redundancy group having M active devices, a standby device expects to receive a heartbeat message for M virtual configurations. When a standby device fails to receive a heartbeat message from one of the M virtual devices, the standby device reports a failed device. A missing heartbeat message occurs when a configurable number of heartbeat messages is not received on any of its interfaces. As described above, a standby device also reports a virtual device failure when it receives a heartbeat with zero priority.

The configuration sequence number is used to synchronize virtual configurations. For each received heartbeat message, a standby device compares the received configuration sequence number with a stored configuration sequence number, i.e., the configuration sequence number of the last stored virtual configuration. When there is a mismatch, the standby device downloads the latest virtual configuration from the management system 102.

When a standby device detects missing heartbeat messages or a heartbeat message with zero priority for a virtual configuration, the standby device attempts to assume the virtual configuration of the failed device. Since multiple standby devices may monitor the health of the active devices and may detect a failed active device, a heartbeat timeout interval may be used. The heartbeat timeout interval varies for each standby device and is skewed based on the priority of the standby device. When a standby device first transitions to an active mode, it immediately transmits a heartbeat to prevent other standby devices from transitioning to an active mode. In the event that more than one standby device transitions to an active mode, the heartbeat message is also used to negotiate which device remains in an active mode. The device with the lower priority relinquishes the active role and reverts to a standby mode. A standby device should only transition to a virtual configuration when the standby device has the latest set of configuration for the failed virtual device.

Figure 2:
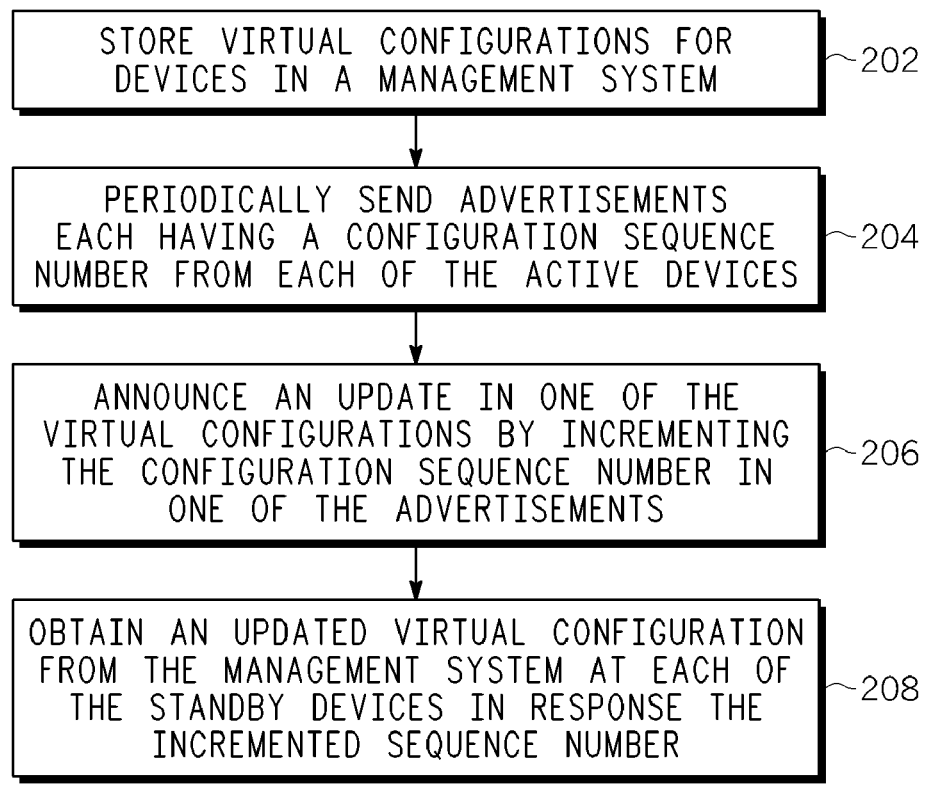
FIG. 2 is a flow diagram depicting an exemplary embodiment of a method of managing the configuration changes in an M:N redundancy, fault-tolerant system in accordance with one or more aspects of the invention.

FIG. 2 is a flow diagram depicting an exemplary embodiment of a method 200 of managing M:N redundancy in a fault-tolerant system in accordance with one or more aspects of the invention. A set of devices forms a redundancy group. Each of the devices is initially configured either in an active role or a standby role with virtual configurations that are obtained from a management system. The method 200 begins at step 202, where virtual configurations for the devices are stored in a management system. At step 204, each of the devices in an active role periodically sends advertisements having a configuration sequence number to each of the devices in the redundancy group. At step 206, an update to one of the virtual configurations is announced by incrementing the configuration sequence number in at least one of the advertisements. At step 208, each of the devices in the standby role obtains an updated virtual configuration from the management system in response to detecting the incremented configuration sequence number. The method 200 may be repeated for multiple updates to various virtual configurations.

Figure 3:
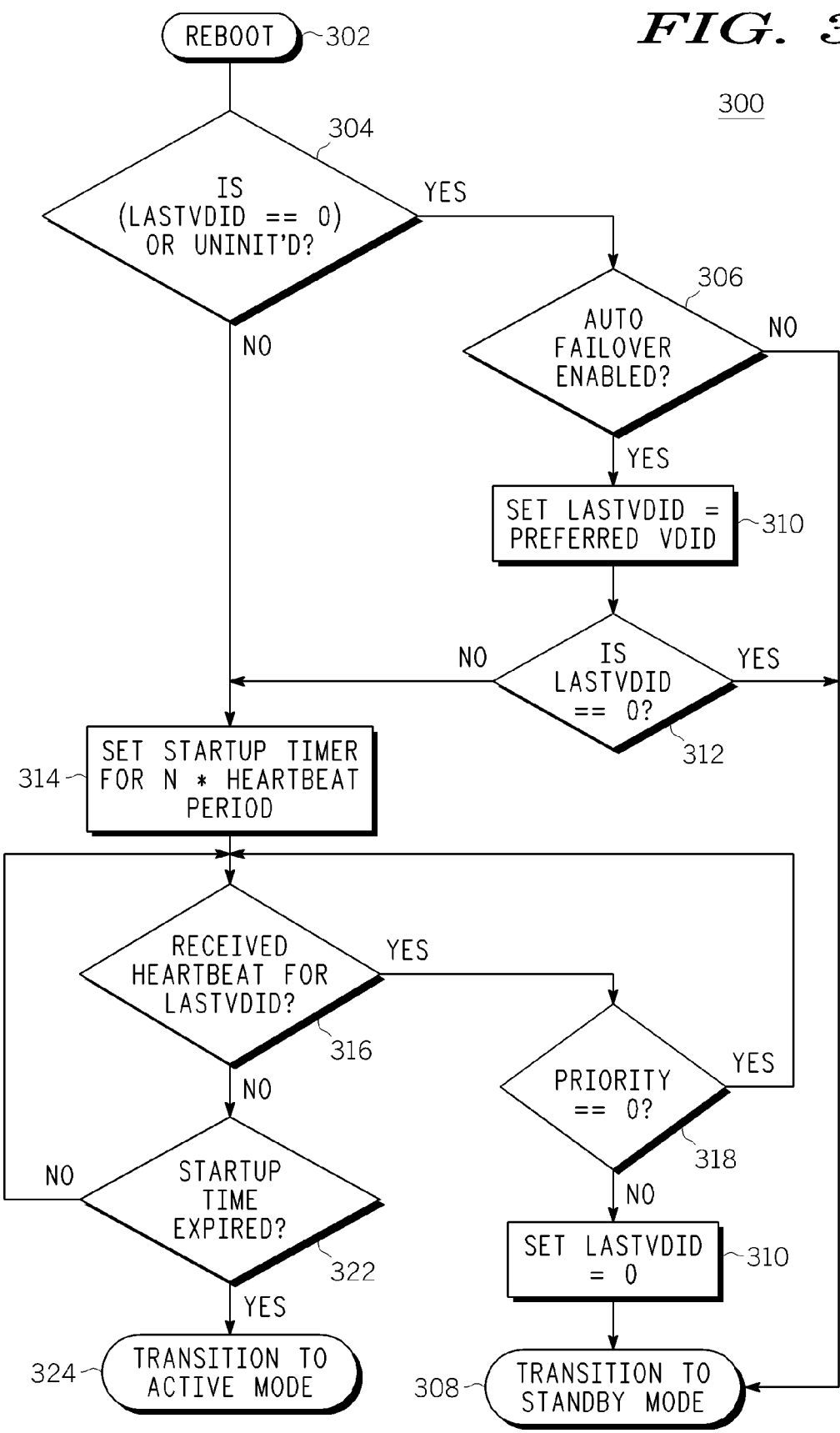
FIG. 3 is a flow diagram depicting an exemplary embodiment of a method for device start-up in accordance with one or more aspects of the invention.

FIG. 3 is a flow diagram depicting an exemplary embodiment of a method 300 for device start-up in accordance with one or more aspects of the invention. The method 300 begins at step 302, where a device is rebooted. At step 304, a determination is made whether the last VDID of the device is equal to zero or un-initialized. If so, the method 300 proceeds to step 306; otherwise the method 300 proceeds to step 314. At step 306, a determination is made whether auto failover is enabled and the failover count is greater than zero. If so, the method 300 proceeds to step 310; otherwise the method 300 proceeds to step 308. If auto failover is enabled in the device, the device is capable of automatically failing over. A manual failover can still occur when auto failover is disabled.

At step 308, the device transitions to standby mode. At step 310, the last VDID of the device is set to a preferred VDID. For primary devices, the preferred VDID is set such that they are in an active role (i.e., non-zero). For backup devices, the preferred VDID is set to zero. At step 312, a determination is made whether the last VDID of the device is equal to zero. If so, the method 300 proceeds to step 308; otherwise the method 300 proceeds to step 314.

At step 314, a startup timer is set for N times a heartbeat period. The heartbeat period is the duration between heartbeat messages. The startup timer is set to some multiple, N, of the heartbeat period. At step 316, a determination is made whether a heartbeat has been received at the device having a VDID equal to the last VDID of the device. If so, the method 300 proceeds to step 318; otherwise the method 300 proceeds to step 322. At step 318, a determination is made whether the priority of the heartbeat message is equal to zero. As described above, a priority of zero in a heartbeat message indicates device failure. If so, the method 300 returns to step 316; otherwise the method 300 proceeds to step 320. At step 320, the last VDID of the device is set to zero. The method 300 proceeds from step 320 to step 308 (transition to standby mode).

At step 322, a determination is made whether the startup time set in step 314 has expired. If so, the method 300 proceeds to step 324; otherwise the method 300 returns to step 316. At step 324, the device transitions to the active mode.

Figure 4:
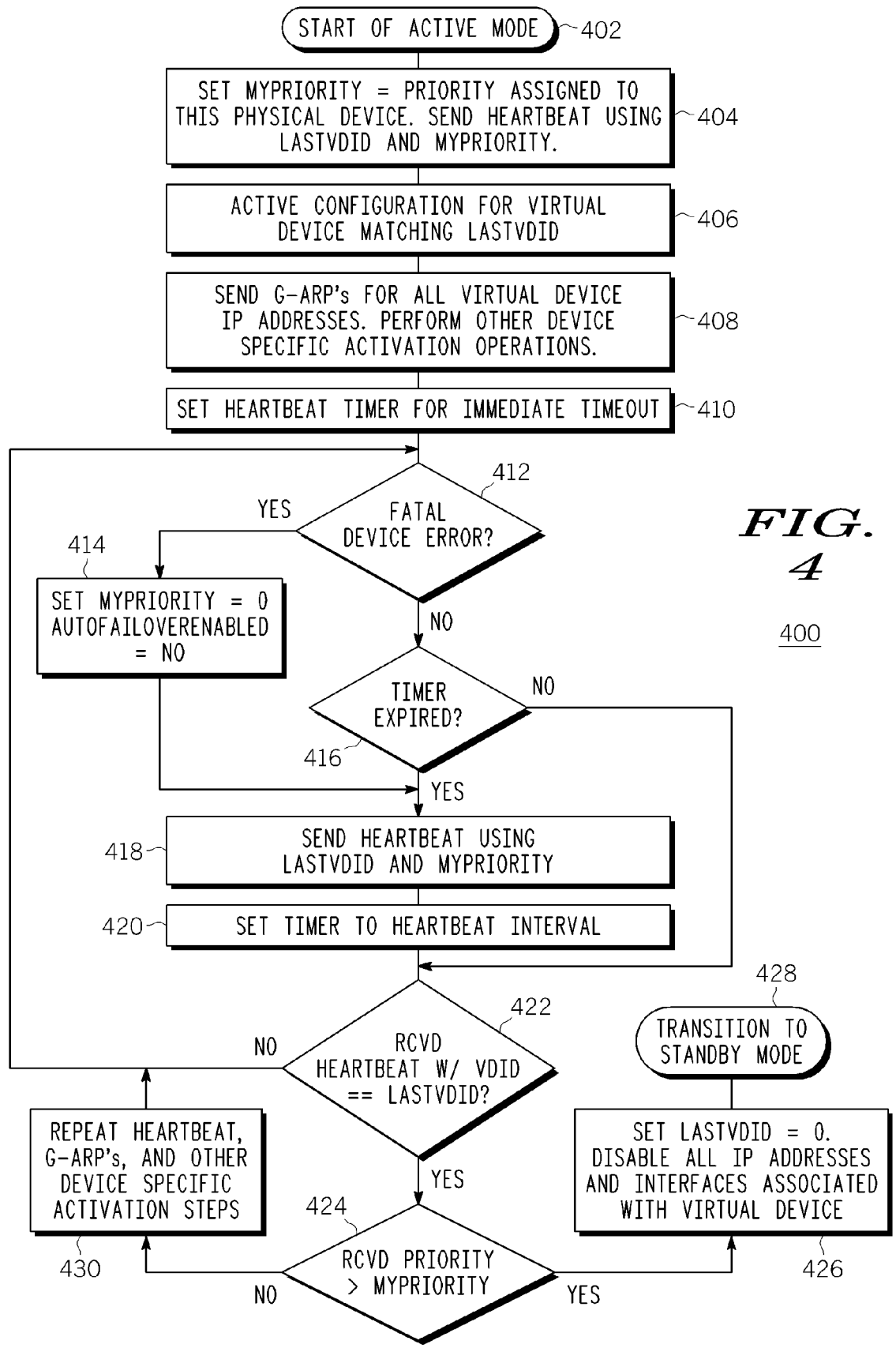
FIG. 4 is a flow diagram depicting an exemplary embodiment of a method for transitioning to an active mode in a device in accordance with one or more aspects of the invention, and the diagram also shows that a device in an active mode transmits and monitors advertisements (i.e. heartbeats)

FIG. 4 is a flow diagram depicting an exemplary embodiment of a method 400 for transitioning to an active mode in a device in accordance with one or more aspects of the invention. The method 400 begins at step 402. At step 404, the priority of the device (MyPriority) is set equal to the priority assigned to the device by the operator and a heartbeat is sent using the last VDID and the priority for the device. At step 406, the virtual configuration matching the last VDID for the device is activated. Activation of the virtual configuration includes activating inputs and outputs of the device as specified by the operating parameters of the virtual configuration.

At step 408, other device specific activation operations may be performed. Such operations include, for example, sending G-ARP's (gratuitous-address resolution protocol) for all virtual device IP addresses. At step 410, a heartbeat timer is set for immediate timeout. At step 412, a determination is made whether there is a fatal device error. If so, the method 400 proceeds to step 414; otherwise the method 400 proceeds to step 416. At step 414, the priority of the device is set equal to zero and auto failover is disabled. The method 400 proceeds from step 414 to step 416. At step 416, a determination is made whether the heartbeat timer has expired. If so, the method 400 proceeds to step 418; otherwise the method 400 proceeds to step 422.

At step 418, a heartbeat is sent using the last VDID and priority of the device. At step 420, the heartbeat timer is set to a predefined interval. At step 422, a determination is made whether a heartbeat is received having a VDID equal to the last VDID of the device. If so, the method 400 proceeds to step 424; otherwise the method 400 returns to step 412. At step 424, a determination is made whether the priority in the received heartbeat message is greater than the priority of the device. If so, the method 400 proceeds to step 426; otherwise the method 400 proceeds to step 430. At step 426, the last VDID of the device is set equal to zero and all IP addresses and interfaces associated with the device are disabled. At step 428, the device transitions to standby mode. At step 430, the device sends a heartbeat and performs the activation steps (e.g., steps 406 and 408). The method 400 returns to step 412 from step 430.

Figure 5:
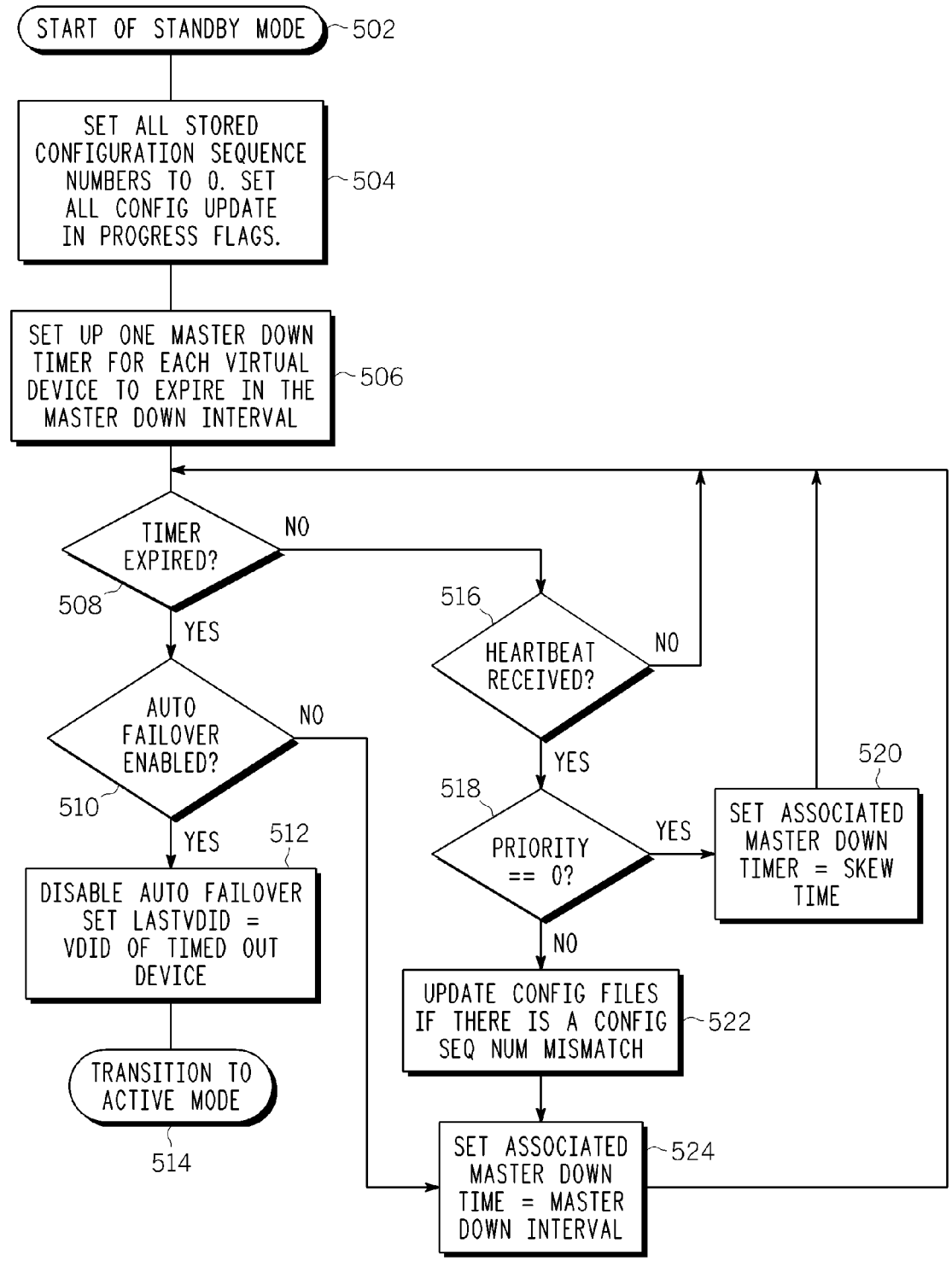
FIG. 5 is a flow diagram depicting an exemplary embodiment of a method for transitioning to a standby mode in a device in accordance with one or more aspects of the invention, and the diagram also shows that a device in an standby mode monitors advertisements (i.e. heartbeats) to detect failed devices.

FIG. 5 is a flow diagram depicting an exemplary embodiment of a method 500 for transitioning to a standby mode in a device in accordance with one or more aspects of the invention. The method 500 begins at step 502. At step 504, all stored configuration sequence numbers are set equal to zero. At step 506, a master down timer is set for each virtual device. The master down timer is set to expire in a master down interval. At step 508, a determination is made whether any of the master down timers has expired. If so, the method 500 proceeds to step 510; otherwise the method 500 proceeds to step 516.

At step 510, a determination is made whether auto failover is enabled for the device. If so, the method 500 proceeds to step 512; otherwise the method 500 proceeds to step 524. At step 512, auto failover is disabled and the last VDID of the device is set equal to the VDID of the timed out device (i.e., the device for which the master down timer expired in step 508). At step 514, the device transitions to the active mode.

At step 516, a determination is made whether a heartbeat is received from the device for which the master down timer expired. If so, the method 500 proceeds to step 518; otherwise the method 500 returns to step 508. At step 518, a determination is made whether the priority in the heartbeat message is equal to zero. If so, the method 500 proceeds to step 520; otherwise the method 500 proceeds to step 522. At step 520, the master down timer is set equal to a skew time. The method 500 proceeds from step 520 to step 508. At step 522, the configuration files of the device are updated if there is a configuration sequence number mismatch (indicating that a virtual configuration has been updated). At step 524, the master down timer is set equal to the master down interval.

Figure 6:
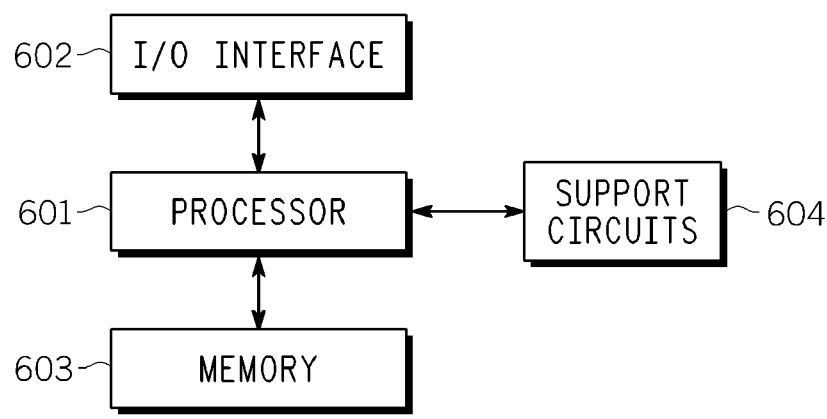
FIG. 6 is a block diagram depicting an exemplary embodiment of a computer capable of implementing the processes and methods described herein in accordance with one or more aspects of the invention.

FIG. 6 is a block diagram depicting an exemplary embodiment of a computer 600 capable of implementing the processes and methods described herein in accordance with one or more aspects of the invention. The primary and backup devices in FIG. 1 may each include the computer 600. The computer 600 includes a processor 601, a memory 603, various support circuits 604, and an I/O interface 602. The processor 601 may be any type of processing element known in the art, such as a microcontroller, digital signal processor (DSP), instruction-set processor, dedicated processing logic, microprocessor, or the like. The support circuits 604 for the processor 601 include conventional clock circuits, data registers, I/O interfaces, and the like. The I/O interface 602 may be directly coupled to the memory 603 or coupled through the processor 601. The I/O interface 602 may be coupled to a frame buffer and a motion compensator, as well as to receive input frames. The memory 603 may include one or more of the following random access memory, read only memory, magneto-resistive read/write memory, optical read/write memory, cache memory, magnetic read/write memory, and the like, as well as signal-bearing media as described below.

In one embodiment, the memory 603 stores processor-executable instructions and/or data that may be executed by and/or used by the processor 601 as described further below. These processor-executable instructions may comprise hardware, firmware, software, and the like, or some combination thereof. Notably, the memory 603 may store instructions for performing the processes and methods described above, including the methods of FIG. 2 through FIG. 5. Although one or more aspects of the invention are disclosed as being implemented as a processor executing a software program, those skilled in the art will appreciate that the invention may be implemented in hardware, software, or a combination of hardware and software. Such implementations may include a number of processors independently executing various programs and dedicated hardware, such as ASICs.

An aspect of the invention is implemented as a program product for execution by a processor. Program(s) of the program product defines functions of embodiments and can be contained on a variety of signal-bearing media (computer readable media), which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

Method and apparatus for facilitating device redundancy in a fault tolerant system is described. One aspect of the invention relates to an M:N device redundancy approach that supports a group of redundant devices, where M standby devices can automatically transition to any of N active devices. This approach uses a generic signaling protocol and failover mechanism that is suitable for a diverse set of devices (e.g., encoders, encryptors, and the like in a cable television headend). The approach also employs a mechanism for synchronizing virtual device configurations across the devices. One unique aspect of the present invention is that a generic signaling protocol and failover mechanism is used that is suitable for a diverse set of devices. Namely, the management system is not concerned with the type of devices that are being managed and it simply uses the exact same redundancy parameters regardless of the device type. In other words, aspects that are specific to the device are separated from the redundancy scheme and redundancy group definition.

While the foregoing is directed to illustrative embodiments of the present invention, other and further embodiments of the invention may be devised without departing from the basic scope thereof, and the scope thereof is determined by the claims that follow.

What is claimed is:

1. A method of common device redundancy for a set of devices in a redundancy group, each of the devices being in either an active role or a standby role, the method comprising:
    storing virtual configurations for the devices in a management system;
    periodically sending, from each of the devices in the active role, advertisements to each of the devices in the redundancy group, each of the advertisements including a configuration sequence number;
    announcing an update in one of the virtual configurations by incrementing the configuration sequence number in at least one of the advertisements; and
    obtaining, at each of the devices in the standby role, an updated virtual configuration from the management system in response to detecting the configuration sequence number as incremented in the at least one advertisement.

2. The method of claim 1, wherein each of the virtual configurations defines a virtual internet protocol (IP) address, a virtual device identifier (VDID), and operating parameters; and wherein each of the advertisements includes a VDID and a priority.

3. The method of claim 2, further comprising:
    activating, at each of the devices in the active role, inputs and outputs as specified by the operating parameters in one of the virtual configurations.

4. The method of claim 2, further comprising:
    detecting, at one or more of the devices in the standby role, at least one missing advertisement or one of the advertisements having a priority of zero;
    identifying one of the virtual configurations associated with the VDID of the at least one missing advertisement or the advertisement having a priority of zero; and
    assuming, at one or more of the devices in the standby role, the virtual configuration as identified and transitioning to the active role.

5. The method of claim 4, further comprising:
    activating, at each of the one or more devices transitioning to the active role, inputs and outputs as specified by the operating parameters of the virtual configuration as identified.

6. The method of claim 4, further comprising, if a plurality of the devices in the standby role assume the virtual configuration as identified:
    selecting one of the plurality of devices based on the priority in the advertisements sent by the plurality of devices.

7. The method of claim 1, wherein each of the devices that transitions from said standby role to said active role includes a native configuration, the native configuration including a fixed portion and one of the virtual configurations.

8. A fault-tolerant system, comprising:
    a set of devices in a redundancy group, each of the devices being in either an active role or a standby role; and
    a management system for storing virtual configurations for the devices;
    wherein each of the devices in the active role is configured to periodically send advertisements to each of the devices in the redundancy group, each of the advertisements including a configuration sequence number;
    wherein each of the devices in the standby role is configured to obtain an updated virtual configuration from the management system in response to detection of an incremented configuration sequence number in the at least one advertisement.

9. The system of claim 8, wherein each of the virtual configurations defines a virtual internet protocol (IP) address, a virtual device identifier (VDID), and operating parameters; and wherein each of the advertisements includes a VDID and a priority.

10. The system of claim 9, wherein each of the devices in the active role is configured to activate inputs and outputs as specified by the operating parameters in one of the virtual configurations.

11. The system of claim 8, wherein each of the devices that transitions from said standby role to said active role includes a native configuration, the native configuration including a fixed portion and one of the virtual configurations.

12. The system of claim 8, wherein each of the devices in the standby role is configured to:
    detect at least one missing advertisement or an advertisement having a priority of zero;
    identify one of the virtual configurations associated with the VDID of the missing advertisement or the advertisement having a priority of zero;
    assume the virtual configuration as identified; and
    transition to the active role.

13. The system of claim 12, wherein each of the devices in the standby role is further configured to:
    activate inputs and outputs as specified by the operating parameters of the virtual configuration as identified in response to transitioning to the active role.

14. The system of claim 12, wherein each of the devices in the standby role is further configured to:
    relinquish the transition to the active role in response to an advertisement associated with the virtual configuration as identified having a higher priority.

15. Apparatus for common device redundancy for a set of devices in a redundancy group, each of the devices being in either an active role or a standby role, the method comprising:
    means for storing virtual configurations for the devices in a management system;
    means for periodically sending, from each of the devices in the active role, advertisements to each of the devices in the redundancy group, each of the advertisements including a configuration sequence number;
    means for announcing an update in one of the virtual configurations by incrementing the configuration sequence number in at least one of the advertisements; and
    means for obtaining, at each of the devices in the standby role, an updated virtual configuration from the management system in response to detecting the configuration sequence number as incremented in the at least one advertisement.

16. The apparatus of claim 15, wherein each of the virtual configurations defines a virtual internet protocol (IP) address, a virtual device identifier (VDID), and operating parameters; and wherein each of the advertisements includes a VDID and a priority.

17. The apparatus of claim 16, further comprising:
    means for activating, at each of the devices in the active role, inputs and outputs as specified by the operating parameters in one of the virtual configurations.

18. The apparatus of claim 16, further comprising:
    means for detecting, at one or more of the devices in the standby role, a missing advertisement or one of the advertisements having a priority of zero;
    means for identifying one of the virtual configurations associated with the VDID of the missing advertisement or the advertisement having a priority of zero; and
    means for assuming, at one or more of the devices in the standby role, the virtual configuration as identified and transitioning to the active role.

19. The apparatus of claim 18, further comprising:
    means for activating, at each of the one or more devices transitioning to the active role, inputs and outputs as specified by the operating parameters of the virtual configuration as identified.

20. The apparatus of claim 15, wherein each of the devices that transitions from said standby role to said active role includes a native configuration, the native configuration including a fixed portion and one of the virtual configurations.

* * * * *